Figure 1:
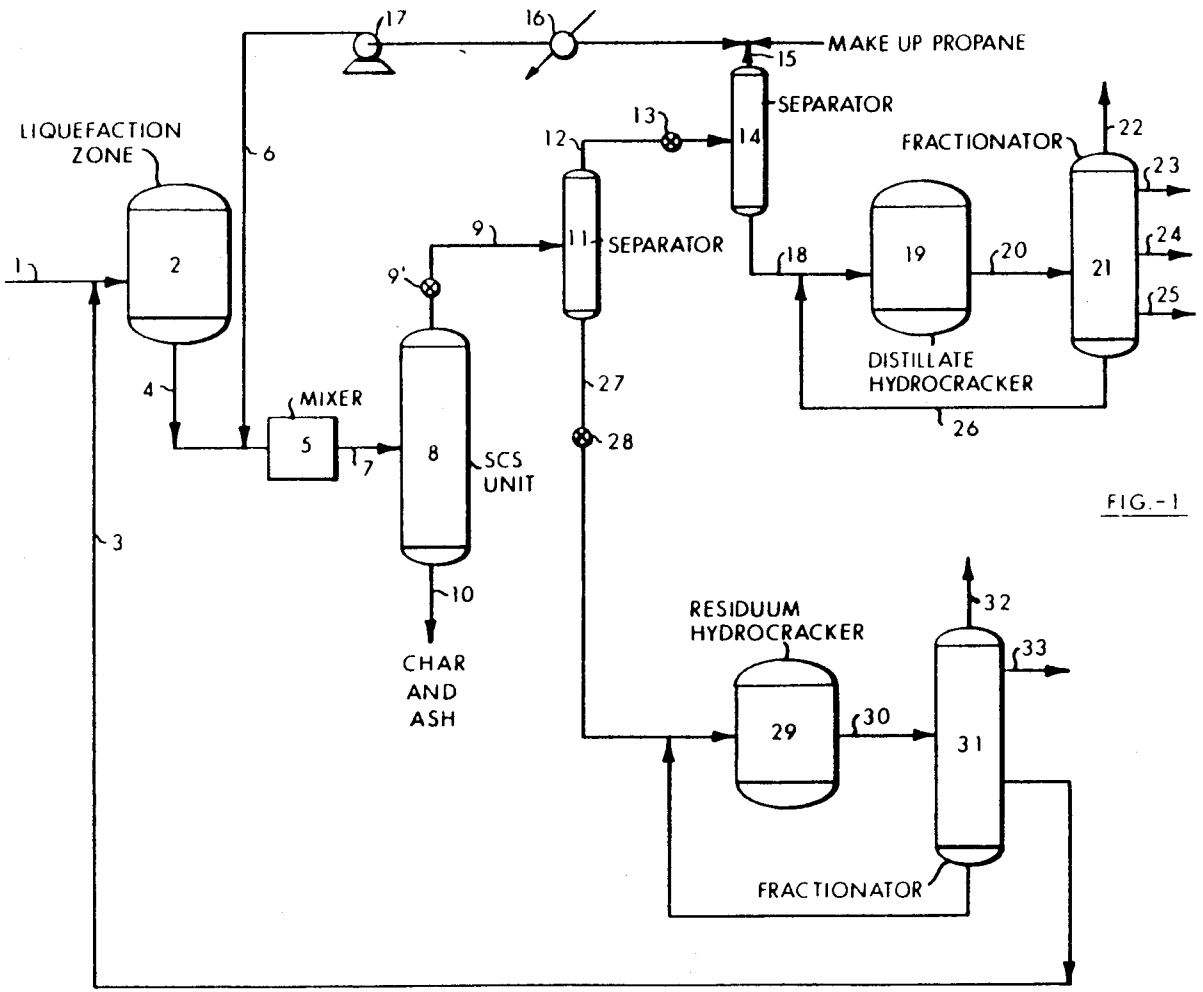
Figure 2:
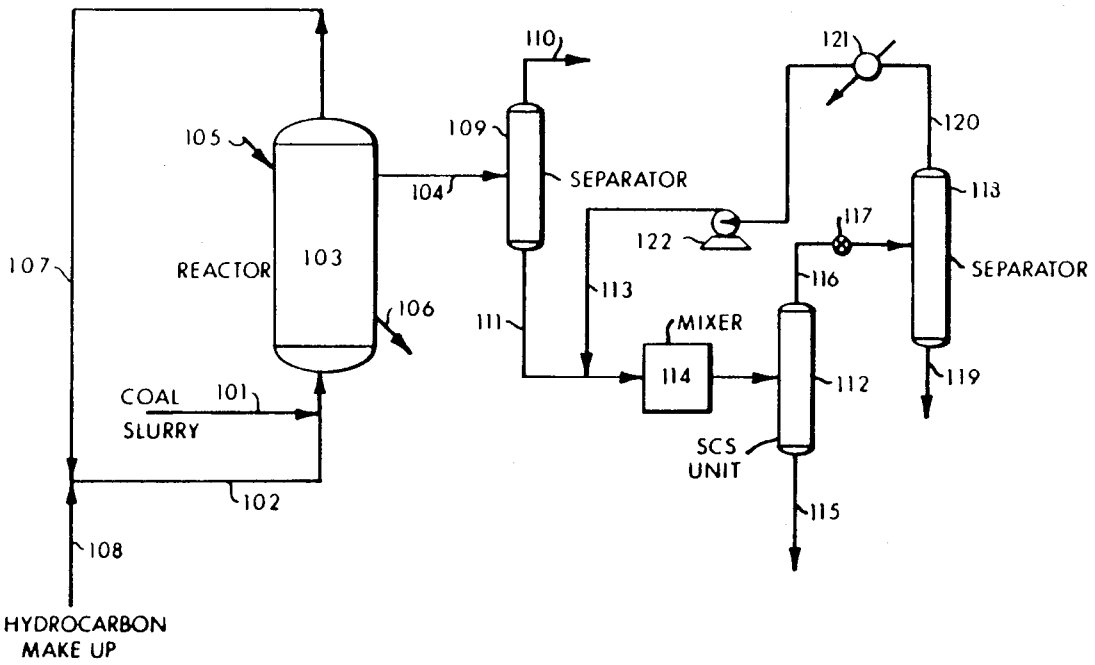

BEST AVAILABLE COPY

T861044

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1020

700,485

PROCESS FOR MAKING LIQUID FUELS FROM COAL

Charles E. Hemminger, 31 Fair Hill Road, Westfield, N.J. 07090, and Seymour Stahl, 135 Windsor Way, Berkeley Heights, N.J. 07922

Filed Jan. 25, 1968. Published Apr. 22, 1969

Class 208—10

2 Sheets Drawing. 11 Pages Specification

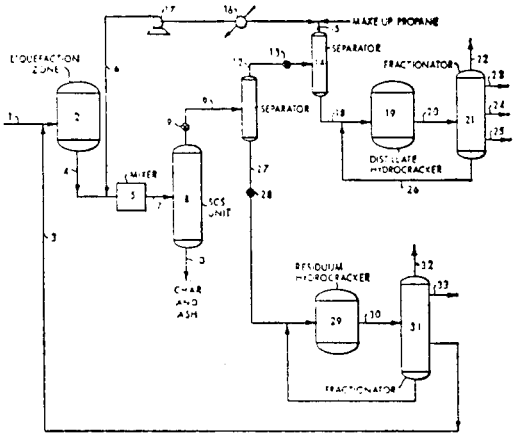

This disclosure relates to a process for making liquid fuels from coal comprising liquefaction of ground coal in a slurry, solvent treatment of the liquefaction effluent at supercritical conditions and subsequent refining of the liquid. Optimum conditions for the unique supercritical separation step will depend upon the critical temperature of the solvent and the molecular type distribution of the feed. Temperatures may range from 220–500° F. and pressures may range from 750–5000 p.s.i.a. Suitable solvents include ethane, propane, butane, pentane, hexane, ethylene, propylene, butylene, halogenated light hydrocarbons, $CO_2$, ammonia, $SO_2$, etc. An essentially solid raffinate phase and an essentially liquid extract phase suitable for hydrocracking are recovered from the supercritical separation step.

208-952
C6306 OR T 861,044 [redacted] E SEARCH

BEST AVAILABLE COPY

April 22, 1969 C. E. HEMMINGER ET AL DEF. PUB. T861

PROCESS FOR MAKING LIQUID FUELS FROM COAL SN - 700485

Filed Jan. 25, 1968 Sheet 1 of 2

C E HEMMINGER
S STAHL Inventors

By C. W. Grady Jr.
Patent Attorney

BEST AVAILABLE COPY

April 22, 1969 C. E. HEMMINGER ET AL DEF. PUB. T8

PROCESS FOR MAKING LIQUID FUELS FROM COAL SN - 700485

Filed Jan. 25, 1968 Sheet 2 of 2

C E HEMMINGER
S STAHL
Inventors

By C. W. Gradyfe
Patent Attorney